United States Patent
Orlamünder et al.

(10) Patent No.: US 6,851,536 B2
(45) Date of Patent: Feb. 8, 2005

(54) DUAL CLUTCH

(75) Inventors: Andreas Orlamünder, Schweinfurt (DE); Sebastian Vogt, Bad Neustadt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/645,074

(22) Filed: Aug. 21, 2003

(65) Prior Publication Data

US 2004/0099499 A1 May 27, 2004

(30) Foreign Application Priority Data

Aug. 22, 2002 (DE) .......................................... 102 38 367
Aug. 7, 2003 (DE) .......................................... 103 36 180

(51) Int. Cl.$^7$ .............................................. F16D 21/06
(52) U.S. Cl. ................................... 192/48.8; 192/70.16
(58) Field of Search ............................. 192/48.8, 48.9, 192/70.16

(56) References Cited

U.S. PATENT DOCUMENTS

| | | | | | |
|---|---|---|---|---|---|
| 3,317,013 A | * | 5/1967 | Smirl | ....................... | 192/70.18 |
| 5,392,888 A | * | 2/1995 | Kajitani et al. | .......... | 192/70.16 |
| 5,634,542 A | * | 6/1997 | Grosse-Erdmann et al. | ..... | 192/70.27 |
| 5,649,348 A | * | 7/1997 | Jackel et al. | ............. | 29/407.08 |
| 6,131,715 A | * | 10/2000 | Hormann et al. | ........ | 192/70.16 |
| 2003/0066730 A1 | * | 4/2003 | Zink et al. | ................. | 192/48.9 |
| 2003/0106767 A1 | * | 6/2003 | Beneton et al. | .......... | 192/111 A |
| 2004/0108181 A1 | * | 6/2004 | Orlamunder et al. | ...... | 192/48.8 |

FOREIGN PATENT DOCUMENTS

EP          1 134 447 A2     3/2001

* cited by examiner

Primary Examiner—Richard M. Lorence
(74) Attorney, Agent, or Firm—Cohen, Pontani, Lieberman & Pavane

(57) ABSTRACT

A dual clutch includes a first clutch area with a housing arrangement connected to an abutment plate; a first pressure plate arrangement; and a force-exerting arrangement, which is supported against the housing arrangement and the pressure plate arrangement, and which can press the pressure plate arrangement toward the abutment plate. A second clutch area includes second pressure plate arrangement and a force-transmitting arrangement, which extends axially across the abutment plate and can exert force on the second pressure plate arrangement. The housing arrangement and the abutment plate are connected to each other by the production of a press fit, and a first force-transmitting element and a second force-transmitting element of the force-transmitting arrangement are also connected to each other by the production of a press fit.

8 Claims, 2 Drawing Sheets

DUAL CLUTCH

BACKGROUND OF THE INVENTION

1. Field of the Invention

The present invention pertains to a dual clutch, with a first clutch area having a housing connected to an abutment plate, a first pressure plate, and a force-exerting arrangement supported against the housing and the first pressure plate, and which can press the pressure plate arrangement toward the abutment plate; and with a second clutch area having a second pressure plate, and a force-transmitting arrangement which extends axially across the abutment plate and can exert force on the second pressure plate.

2. Description of the Related Art

In dual clutches of this type, the housing can be screwed to the abutment plate, which establishes the connection to a drive element. For this purpose, the housing is usually provided with a radial flange area, through which fastening screws extend in the axial direction. The force-transmitting elements of the force-transmitting arrangement are also usually connected to each other by screws. These screw joints take up a comparatively large amount of space, which frequently leads to problems because of the need in dual clutches of this type to house a large number of components in a small amount of space.

SUMMARY OF THE INVENTION

The object of the present invention is to provide a dual clutch which, while being simple and compact in design, can be assembled with precision.

According to the invention, the housing and the abutment plate are connected to each other by the production of a press fit and/or where a first force-transmitting element and a second force-transmitting element of the force-transmitting arrangement are connected to each other by the production of a press fit.

The use of a press fit to connect two components such as, for example, the housing and the abutment plate makes it unnecessary to provide additional screw bolts or the like and the corresponding sections through which they must pass. The components can be connected to each other simply by the frictional locking forces present in the press fit. This offers the additional advantage that, when the components to be connected are brought toward each other and fitted into each other, they can be brought into a defined position, which does not necessarily have to be determined by an end stop or the like. As a result, it becomes possible to position the components to be connected to each other by the press fit so precisely with respect to each other that the various clutch areas can display their optimum functional characteristics.

For example, the abutment plate can be provided with a ring-like first connecting area with an inner connecting surface, and the housing arrangement can be provided with a ring-like second connecting area with an outer connecting surface. The press fit can then be produced by inserting the second connecting area axially into the first connecting area. The housing arrangement in this case is preferably shaped from sheet metal. As a result of the centrifugal forces which occur when a friction clutch of this type is operating, the housing arrangement, which is shaped from sheet metal and is therefore weaker than the abutment plate, which is usually made as a casting or some other type of solid component, is pretensioned in the radially outward direction against the first connecting area of the abutment plate, which means that, while the clutch is rotating, the friction-locking connection is made even stronger.

To ensure an even greater degree of security with respect to the strength of the connection after the two components to be connected have been positioned precisely with respect to each other, the housing arrangement and the abutment plate can be connected not only by the press fit but also by connecting elements and/or by welding, by bonding with an adhesive, or by some similar method.

So that it is possible to produce a connection between the force-transmitting elements by means of a press fit, one of the force-transmitting elements can have a ring-like first connecting area, that the other one of the force-transmitting elements have a second connecting area with a plurality of axial projections, and that the press fit be produced by sliding the first and the second connecting areas axially into each other. When this type of arrangement is used, it should therefore be taken into account that at least one of the force-transmitting elements which extends past the abutment plate must pass through openings in the abutment plate. So that it possible to make use again of the centrifugal forces which develop during the rotation of the clutch to reinforce the connection between the two force-transmitting elements, it is proposed that the first connecting area have an inner connecting surface, that the second connecting area have an outer connecting surface, and that the second connecting area be pushed into the first connecting area. In addition, especially in view of the intrinsic elasticity present in the area of the axial projections, a very strong connection can be obtained by providing a support ring to give radial support to the second connecting area on the side facing radially away from the first connecting area.

As a way of increasing the strength of the connection in the area of the force-transmitting elements, it can again be advantageous to connect the force-transmitting elements together not only by the use of a press fit but also by the use of connecting elements and/or welding, adhesive bonding, or the like.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
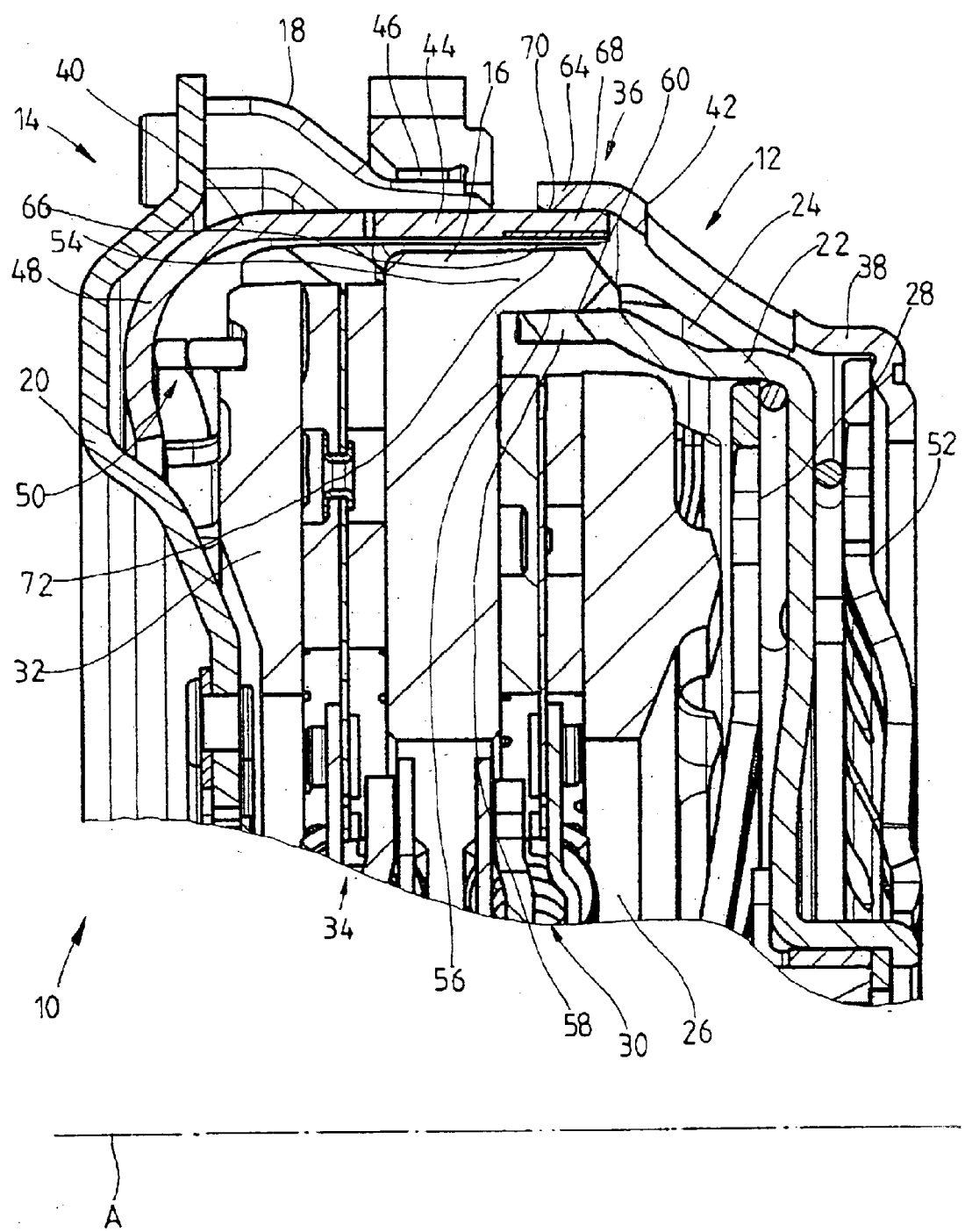
FIG. 1 is a partial longitudinal cross sections through a dual clutch according to the invention.

As shown in FIG. 1, the dual clutch 10 comprises a central plate 16, which acts as an abutment plate for the two clutch areas 12, 14. This central plate carries or has radially outer connecting elements 18, which make it possible for a connection to be established to a drive shaft (not shown) by the use of a connecting plate 20, which can be designed as a flexplate or the like.

The first clutch area 12 comprises a cup-like housing 22, made as a shaped part of sheet metal, for example. The housing has a section 24, which extends approximately in the axial direction; this section serves to connect the housing 22 to the central plate 16, as will be described again further below. A pressure plate 26 of the first clutch area 12 is also provided in the housing 22. The radially outer area of a force-exerting arrangement 28 comprising, for example, a plurality of lever elements or an energy storage element such as a diaphragm spring or the like is supported on the housing 22, and an area of this arrangement located somewhat further inward in the radial direction can exert force on the pressure plate 26 and thus press it toward the central plate 16 to clamp a clutch disk 30. To generate this force-exerting effect, an actuating mechanism can act on the radially innermost area of the force-exerting arrangement 28; in cases where the force-exerting arrangement 28 consists of a plurality of lever elements, the force to be produced here would be a clutch-engaging force.

The second clutch area 14 comprises a pressure plate 32, which, with respect to the pressure plate 26, is located on the other axial side of the central plate 16. A second clutch disk 34 can be clamped between this pressure plate 32 and the central plate 16. To generate the force required to accomplish this, a force-transmitting arrangement 36 is provided, which, in the example presented here, comprises two force-transmitting elements 38, 40, which can also be made in the form of shaped parts of sheet metal. The force-transmitting element 38, like the housing 22, has a roughly cup-like shape and is mounted essentially outside the housing 22 and surrounds it. This force-transmitting element has a section 42, which extends approximately in the axial direction and which is used to connect the element 38 to the other force-transmitting element 40. This other element has a plurality of axial projections 44, which pass through openings 46 in the central plate 16 and thus extend across it. A ring-like area 48 of the force-transmitting element 40 which grips behind the central plate 16 and the pressure plate 32 is thus able to exert force on the pressure plate 32 by way of, for example, a wear take-up device 50. So that the force-exerting effect can be generated for this second clutch area 14, another force-exerting arrangement 52 is provided. This, too, can comprise a plurality of lever elements or an energy storage element, and it is supported on the outside surface of the housing 22; with respect to the support of the previously mentioned force-exerting arrangement 28, it is therefore supported on the other axial side of the housing 22. The radially outer area of this second force-exerting arrangement acts on the force-transmitting element 38. Here, too, therefore, when a plurality of lever elements is provided, a clutch-engaging mechanism is required to provide the force needed to engage the second clutch area 14. The two clutch areas 12, 14 presented here are therefore of the "normally open" type, which, when not being actuated, are not exerting any force. When the associated clutch area 12 or 14 is to be engaged, the appropriate engaging force must therefore be provided. Of course, in cases where the force-exerting arrangements 28, 52 are in the form of diaphragm springs or the like, the dual clutch 10 could just as well have clutch areas 12, 14 of the "normally closed" type.

So that the central plate 16 can be connected to the housing 22, it has a ring-like axial projection 54. This forms a first connecting area, which has an inner connecting surface 56, facing radially inward. In a corresponding manner, the housing 22 has an axially oriented section 24 with a second connecting area 58, which has an outer connecting surface 60, facing essentially radially outward. The outer areas 54, 58 of the housing 22 and the central plate 16 are matched to each other in such a way that a press fit in the form of a so-called longitudinal press fit is produced when they are pushed axially into each other. For this purpose, it is possible to chamfer the end of at least one of these components to give it a funnel-like shape which facilitates the insertion. Alternatively or in addition, this press fit can be produced by heating the central plate 16 so that it expands slightly and thus allows the housing 22 to be inserted. When the plate cools and contracts radially, the longitudinal press fit is obtained with a friction-locking connection in the axial direction.

The connection of these two parts 22, 16 by the use of a press fit makes it unnecessary to provide any of the fastening screws familiar from the state of the art. This leads to a highly compact design. It also becomes possible adjust the distance by which the housing 22 is inserted into the intermediate plate 16 in such a way that the position which they assume with respect to each also positions the pressure plate 26 in its own optimum position under consideration of the axial thickness of the friction linings of the clutch disk 30. To make this connection even more secure, fastening pins can be inserted or screws can be screwed in the radial direction, thus producing a positive connection which locks the components together in the axial direction. Welds could also be made or an adhesive could be applied, etc., to connect these components. The central plate 16 could also have an axial projection which is inserted into the housing 22 to produce a press fit.

A very compact arrangement can be obtained in the area of the connection of the two force-transmitting elements 38, 40 by producing a press fit here as well. Thus the essentially cup-shaped force-transmitting element 38 can have a ring-like first connecting area 64 with a radially inward-facing inner connecting surface 66. The free end areas of the axial projections 44 form a second connecting area 68 with an essentially radially outward-facing outer connecting surface 70, which consists here of several flat segments. Here, too, a press fit can be obtained by pushing the two components axially into each other, possibly with the help of feed chamfers or the like. To ensure that the axial projections make sufficiently strong contact radially toward the outside, it is possible to secure them with a support ring 72 on the side facing away from the first connecting area 64 to prevent the projections from escaping radially toward the inside. The connection between the two force-transmitting elements 38, 40 can also be given a greater degree of strength by welding them together as well, for example, or by bonding them with an adhesive or by using some other suitable method of positive or non-positive connection, possibly also by inserting fastening pins or by screwing in screws in the radial direction. This assembly again provides the basic advantage that the relative position of the two force-transmitting elements 38, 40 can be adjusted during the assembly of the dual clutch, so that the pressure plate 32 provided for the second clutch area 14 can also assume its optimum position with respect to the central plate 16. It is therefore possible to take into account or to compensate for the manufacturing tolerances present in the area of the various components of the two clutch areas when the housing 22 is installed and when the two force-transmitting elements 38, 40 are assembled.

Figure 2:
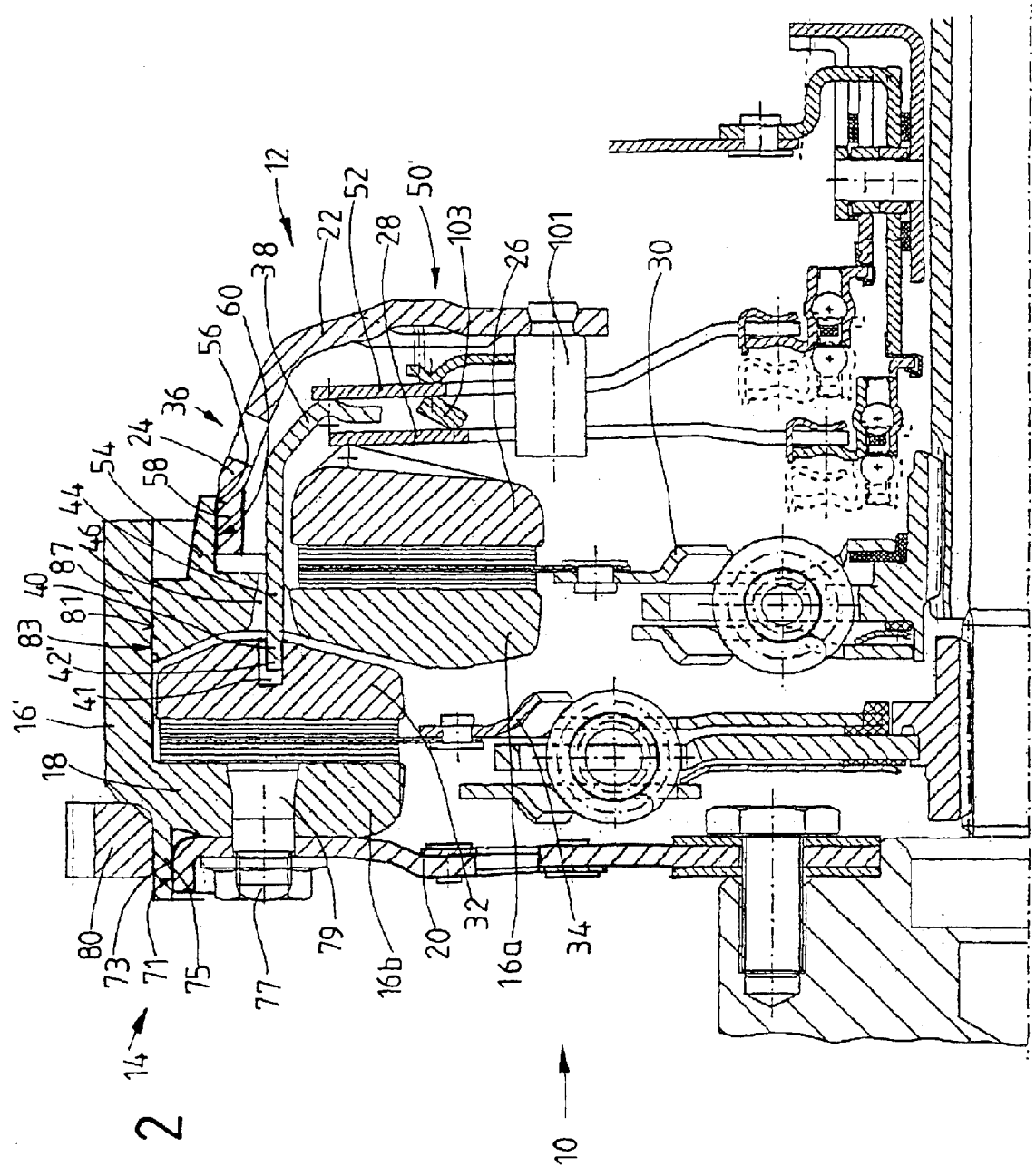
FIG. 2 is a partial longitudinal cross-section of an alternative embodiment.

The dual clutch 10 shown in FIG. 2 comprises an alternative embodiment, shown in the form of a partial longitudinal cross section. This figure shows the details of an embodiment according to the invention in which two diaphragm springs are used as the force-exerting arrangements, which means that the two individual clutch areas of this dual clutch 10 are of the "normally closed" type. The first clutch area 12 comprises a cup-like housing 22, formed from sheet metal, which holds so-called spacer bolts 101 in an area of the housing 22 which extends essentially in the radial direction. These bolts support the two force-exerting elements 28, 52 in nonrotatable fashion. In another, axially oriented area of the housing 22, the housing has a section 24, extending in the axial direction, which interacts with a first abutment area 16*a*. A pressure plate 26, assigned to the first clutch area 12, is installed radially inside the housing 22; the pressure plate works with the first abutment area 16*a* to clamp the friction linings of a first clutch disk 30 under the action of a force-exerting arrangement 28, which is designed here as a diaphragm or disk spring. The radially inner end of the force-exerting arrangement 28 has a so-called clutch-release element, containing a clutch-release bearing, by means of which the force-exerting arrangement 28 can be brought from its engaged state into the disengaged state. The force-exerting arrangement 28 is positioned in the axial direction by a support ring 103, for which purpose the support ring 103 passes axially through another, second force-exerting arrangement 52, so that it can support itself on a wear take-up device 50', which, when the friction linings on the clutch disks wear down, increases its axial dimension to a corresponding extent. Alternatively, it is also conceivable that the force-exerting arrangement 28 could be supported by the support ring 103 directly on the housing 22 of the first clutch area 12 and that a wear take-up device for compensating for the wear of the friction linings could be introduced between the force-exerting arrangement 28 and the pressure plate 26. In such an alternative embodiment, the wear take-up device 50' shown here would act only to compensate for the lining wear of the second clutch disk 34 and thus act only on the second force-exerting arrangement 52.

The second force-exerting arrangement 52 mounted axially between the housing 22 and the first force-exerting arrangement 28 is also supported in the radial and circumferential directions by spacer bolts 101 attached to the housing 22. The radially inner area of the second force-exerting arrangement 52 works together with its assigned clutch-release element, containing a clutch-release bearing; the radially outer area of the second force-exerting arrangement 52, the so-called "spring area", acts on a force-transmitting arrangement 36, which transmits the applied force to a second pressure plate 32 of the second connecting element 18. The force-transmitting arrangement 36 consists of the force-transmitting elements 38 and 40, which, when the dual clutch arrangement is assembled, are connected to each other to form the one-piece force-transmitting arrangement 36. Thus the force-transmitting arrangement 36 passes through the openings 46 in the first abutment area 16*a*, its finger-like axial projections 44 projecting into these openings 46. The openings 46 are arranged in a ring in the first abutment area 16*a*. The force-transmitting element 40 extends in the axial direction from the finger-like axial projections 44 toward the second pressure plate 32 of the second connecting element 18, and its axially oriented terminal section 42' forms a closed ring, which engages by a press fit in an annular channel in the second pressure plate 32 to serve as a connecting area 41. Because the axially oriented terminal section 42' is designed as a closed ring, a sufficient degree of dimensional stability can be achieved even if the force-transmitting arrangement 36 is made out of thin sheet metal. That is, the press fit which can be obtained in association with the connecting area 41' guarantees a sufficiently strong seat. In this example of FIG. 2, the radially outward facing axial surface of the annular channel cooperates for this purpose with the radially inward-facing axial surface of the axially oriented terminal section 42' in the connecting area 41 of the second pressure plate 32 of the second clutch area. The connecting area 41 has sufficient length in the axial direction to ensure a secure connection with the force-transmitting arrangement 36. Thus a connection is established which is strong enough to transmit the forces which occur during operation and during assembly. When this longitudinal press fit is being produced, furthermore, it is again possible to adjust the axial dimension to a predetermined value. For example, if errors in the axial dimensions of the various components with axial parts accumulate to an unfavorable extent, individual adjustments can be made to correct for them. Nor is it necessary to use an expensive and difficult fabrication method to produce the force-transmitting arrangement 36 and to provide it with precisely defined axial dimensions, because any manufacturing tolerances which occur can be compensated when the arrangement is connected to the second pressure plate 32. It is also conceivable as an alternative that the connecting area 41 could have a radially inward-facing axial surface by which it could be connected by a corresponding press fit to the force-transmitting arrangement 36. In this case, the terminal area 42'? would then have a radially outward-facing axial surface by which it is press fit in the radially inward-facing surface of the annular channel. To increase the strength of the press fit, the axial surfaces cooperating with each other in the area of the press fit can be knurled or have a certain suitable roughness such as the circumferential scoring which results from turning on the lathe. The surfaces which are press-fit against each other thus interlock, which is advantageous. To achieve an especially strong joint between the connecting area 41 and the axially oriented terminal section 42' of the force-transmitting element 40, both the radially outward-facing axial surface of the connecting area 41 and the radially inward-facing axial surface of this same connecting area can participate in the formation of the press fit with the previously mentioned terminal section 42'. This is especially advantageous when the openings 46 in the first abutment area 16*a* are holes with a certain elongation in the circumferential direction, through which the finger-like axial projections 44 pass and then continue to the terminal section 42' without forming a closed ring. It thus becomes very easy to put the first abutment area 16*a*, the force-transmitting element 36, and the second pressure plate 32 together during the assembly process. But because the axially oriented terminal section 42' is not a closed ring, it will not have the associated structural rigidity required for a sufficiently strong press fit in cooperation with the connecting area 41 if only one of the two radially oriented axial surfaces cooperates with the force-transmitting element 40. Via the force-transmitting element 36, it is now possible for the second pressure plate 32 to act on the second clutch disk 34 together with the second abutment area 16*b* in the known manner. The second abutment area 16*b* is also connected by a press fit according to the invention to the first abutment area 16*a* and thus forms a common abutment 16'. The connection between them will be discussed again later.

The second clutch area 14 has a connecting element 18, the radially inner area of which forms the second abutment area 16*b*. The connecting element 18 has a centering collar 71, which cooperates with a connecting plate 20, which is designed here as a so-called flexplate and which can thus compensate for wobbling and axial misalignments between the crankshaft and the transmission input shafts. The connecting plate 20 is fastened to the crankshaft in the conventional manner, e.g., by the use of a set pin connection or a threaded connection or by a single central screw. Connecting the plate to the crankshaft by a single central screw offers the advantage that the connecting plate and the dual clutch assembly 10 can be attached as a single unit to the crankshaft of the engine, in that the central attachment can be made through the opening through which the transmission input shafts, with which the clutch disks 30 and 34 will engage, will later project, and thus the dual clutch can be connected as a complete assembly to the engine. The connecting plate 20, which is designed here as a flexplate, is also attached firmly to the connecting element 18 by a so-called press fit. For this purpose, the centering collar 71 has radially inward-facing, axially oriented inner connecting surfaces 73, which lie on an imaginary circle passing around the circumference. Designing the inner connecting surface 73 as a series of individual sections instead of a continuous ring for making contact with the flexplate has the effect of reducing both the production costs and the weight of the component. The gear ring 80 mounted radially on the outside, with which the starter pinion engages, stiffens the centering collar 71 to such an extent that it can easily absorb the support forces which the inner connecting surface 73 and the outer connecting surface 75 exert against each other during the production of the press fit between the connecting plate 20 and the connecting element 18 and thus ensures a sufficiently strong connection. The connecting plate 20 is also provided with so-called joint separators 77, by means of which the press fit between the connecting plate 20 and the connecting element 18 can be made and unmade. For this purpose it is possible, for example, to use screws as joint separators 77, which are held in the connecting plate 20 in such a way that they can turn freely but cannot move in the axial direction. This can be achieved by, for example, providing a collar on the head of the screw, which is held with freedom of rotation but without freedom of axial movement in a groove made in the connecting plate 20. This groove extends completely around the flange collar on the head of the screw, and thus the screw is held in this groove extending around the head so that it can turn but cannot move in the axial direction. By providing several of these joint separators 77 on the connecting plate 20 and by providing corresponding retaining areas 79 in the connecting element 18, it is possible to join the connecting plate 20 to the connecting element 18 to obtain the desired press fit. The joint separators 77 are not intended primarily to transmit the drive torque; instead, although they do provide a certain safety margin by increasing the amount of torque which can be transmitted, the primary reason for installing the joint separators 77 is that, if damage should occur or it should prove necessary to make repairs, they can be actuated to separate the dual clutch 10 from the connecting plate 20.

For this purpose, the joint separators, which are shown in the example in the form of screws, are turned, and as a result of their threaded engagement with the connecting element 18, they force the connecting plate 20 away from the connecting element 18, thus releasing or separating the press fit between the outer connecting surface 75 and the inner connecting surface 73 under the action of the axially-oriented force.

In an alternative embodiment, it is also possible to design this connection between the connecting plate 20 and the connecting element 18 in such a way that the outer connecting surface 75 cooperates with the inner connecting surface 73 not in the manner of a press fit but rather in the manner of a so-called "medium" or "transition" fit. A transition fit is characterized in that the overallowance of the inner connecting surface 73 and underallowance of the outer connecting surface 74 are coordinated so that, after the parts are assembled, there is no play between them, but rather a so-called transition fit, which means that force must be exerted in the axial direction to join the two components 20 and 18 to each other, but the connection between the two components (connecting plate 20 and connecting element 18) at the outer connecting surface 75 of the one and the inner connecting surface 73 of the other is not strong enough to transmit the applied torque. The outer connecting surface 75 and the inner connecting surface 73 are in frictional engagement with each other only to the extent that, after the two components have been assembled, the surfaces rub against each other, but only modest force is required either to put them together or to separate them.

For example, transition fits of the H7/k6 type according to DIN 7,157 or, for a permanent seat, a H7/n6 transition fit can be used. Corresponding examples of these fits can be found in *Taschenbuch für Maschinenbau* [*Manual of Machine Building*], Dubbel, 15th edition, page 339. By joining the connecting plate 20 to the connecting element 18 by means of a press fit as described above, an exact and permanent connection is made without the danger of creating an imbalance during the assembly procedure.

It should also be mentioned here that the connection between the retaining area 79 and the joint separator 77 can also be achieved by designing the retaining area 79 as a so-called stud bolt, that is, a bolt with a threaded section which is introduced into the connecting element 18 and with a head, which is attached to the connecting plate 20. It is also possible, as an alternative, to design the retaining area 79 as a stud bolt with a cylindrical section, which serves as a set pin and projects out from the connecting element 18. The section projecting axially further outward represents the threaded section. Corresponding designs are also illustrated in the *Manual of Machine Building* cited above. In cases where the gear ring 80 must be at a precise, predefined angular position with respect to the crankshaft so that, for example, the firing order can be controlled, the dual clutch 10 can be prepositioned precisely in terms of its angular position with respect to the crankshaft by distributing the joint separators 77 and the cooperating retaining areas 79 nonuniformly around the circumference.

The connection of the first abutment area 16a to the housing 22 at the second connecting area 58 is again accomplished by the production of a press fit in correspondence with the previous descriptions of FIGS. 1 and 2. Here an axial projection 54 is formed on the first abutment area 16a, which is to be considered part of the overall abutment area 16'; this projection is radially outside the housing 22 and has a radially inward-facing inner connecting surface 56 extending in the axial direction. The axial projection 54 is preferably designed as a closed, circumferential, ring-shaped extension because this gives the component greater stiffness, and a stronger press fit can thus be produced. In corresponding fashion, an axially oriented section 24 with a radially outward-facing outer connecting surface 60 is provided on the housing 22. In correspondence with the examples described above, a sufficiently strong press fit is obtained between the inner connecting surface 56 and the cooperating outer connecting surface 60; and the axial dimensions of this press fit can be precisely determined when the connection is being made. To obtain a stronger connection for this press fit between the housing 22 and the first abutment area 16a, it is also possible to introduce a hole passing radially through the axial projection 54 and at least partially through the axially oriented section 24 and to hammer a set pin or to introduce a rivet into this hole. Screws could also be used as an alternative method of securing the joint. The screw would in this case pass radially from the outside through the axial projection 54 of the first abutment area 16a and extend into the axially oriented section 24 of the housing 22.

The connection of the first abutment area 16a to the second abutment area 16b is also accomplished by way of a press fit according to the invention. The third connecting area 83 also has an inner connecting surface 83 belonging to the second abutment area 16b, which faces radially inward and extends in the axial direction and which, after installation, is in working connection with the outer connecting surface 81 of the first abutment area 16a. It is also possible in principle to design the third connecting area 83 in the same way as the fourth connecting area 77, which is formed between the outer connecting surface 75 and the inner connecting surface 73. The explanations concerning the press fit of the connecting plate 20 with the connecting element 18 also apply here. It is also possible to provide here either a permanent press fit or an appropriate transition fit. As can be seen from the drawing, the third connecting area 83, like the fourth connecting area 77, is subjected to all of the torque of the engine or of the transmission, as a result of which very high demands are made on its load capacity and durability. To produce a press fit between the first abutment area 16a and the second abutment area 16b, the outer connecting surface 81 of the first abutment area 16a is brought into working connection with the inner connecting surface 83 of the second abutment area 16b. To increase the torque-transmitting capacity in the area of the third connecting area 83 even more, it is possible to drill a hole radially from the outside through the second abutment area 16b and to extend this hole through the inner connecting surface 83 and the outer connecting surface 81. After the press fit has been produced, a rivet can be inserted or a pin hammered in or, if a threaded hole has been provided instead of a smooth one, a screw can be screwed in. As a result, a positive connection is made between the first abutment area 16a and the second abutment area 16b, which assists the transmission of forces in both the axial and the circumferential directions. To increase the torque-transmitting capacity of the press fit of the third connecting area 83, it is also conceivable that, in the area of the outer axial end of the outer connecting surface 81, a chamfer can be provided all the way around the circumference of the first abutment area 16a, and this chamfer can then be filled with a weld. The first abutment area 16a and the second abutment area 16b would therefore be at least partially welded together here. In the case that either one of the abutment areas 16a, 16b or both have a high carbon content, it is conceivable that the previously mentioned V-seam or the previously mentioned "chamfer" could be made quite large so that a thick V-seam with a large amount of weld metal could be introduced. In that case, the weld metal should preferably have a high nickel content or an especially low carbon content to avoid unwanted stresses in the weld or excessive hardening of the components which have been thus fused together.

In a further elaboration of the invention, it is also conceivable that ideas or inventive elements of FIG. 1 could be combined with corresponding details of FIG. 2 or alternatively that design details could be taken from both figures and combined with each other.

The invention is not limited by the embodiments described above which are presented as examples only but can be modified in various ways within the scope of protection defined by the appended patent claims.

We claim:

1. A dual clutch comprising:

a first clutch area comprising a housing connected to an abutment plate by a press fit, a first pressure plate, and a force exerting element supported against the housing and urging the pressure plate toward the abutment plate, and a second clutch area comprising a second pressure plate and a force transmitting arrangement which extends axially across the abutment plate and can exert force on the second pressure plate, said force transmitting arrangement comprising a first force transmitting element and a second force transmitting element connected by a press fit.

2. A dual clutch as in claim 1 wherein said abutment plate has a radially inner connecting surface and said housing has a radially outer connecting surface which receives said radially inner connecting surface in a press fit.

3. A dual clutch as in claim 1 wherein said housing comprises a part formed of sheet metal.

4. A dual clutch as in claim 1 wherein said housing wherein said housing and said abutment plate are also connected by at least one of connecting elements, welding, bonding, and adhesive.

5. A dual clutch as in claim 1 wherein said first force transmitting element has a ring-like first connecting area and said second force transmitting element has a second connecting area with a plurality of axial projections, one of said connecting areas being axially inserted into the other connecting area.

6. A dual clutch as in claim 5 wherein the first connecting area has an inner connecting surface and the second connecting area has an outer connecting surface which is inserted inside the inner connecting surface.

7. A dual clutch as in claim 5 wherein the second connecting area has a side facing radially away from the first connecting area, said dual clutch further comprising a support ring against said side facing radially away from the first connecting area.

8. A dual clutch as in claim 5 wherein said first and second force transmitting elements are also connected by at least one of connecting elements, welding, bonding, and adhesive.

* * * * *